(12) United States Patent
Ochi et al.

(10) Patent No.: US 6,335,758 B1
(45) Date of Patent: *Jan. 1, 2002

(54) DIGITAL CAMERA EMPLOYING A LINE SENSOR WITH ASPECT RATIO COMPENSATION MECHANISM

(75) Inventors: Keizou Ochi, Takatsuki; Takashi Kondo, Sakai; Yoshiaki Hata, Ashiya, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,687

(22) Filed: Feb. 28, 1997

(30) Foreign Application Priority Data

Mar. 1, 1996 (JP) .............................................. 8-045128

(51) Int. Cl.[7] ................................................ H04N 5/225
(52) U.S. Cl. ........................................ 348/335; 348/358
(58) Field of Search ................................ 348/324, 195, 348/202, 262, 264, 265, 297, 298, 96, 97, 98, 344, 335, 358, 340, 343; 358/462, 487

(56) References Cited

U.S. PATENT DOCUMENTS

| 4,712,142 A | * | 12/1987 | Tomita et al. | ............... 358/468 |
| 5,610,730 A | * | 3/1997 | Osipchuk | ..................... 358/494 |
| 5,757,518 A | * | 5/1998 | Kashitani | ..................... 358/474 |
| 5,933,186 A | * | 8/1999 | Ikari et al. | ..................... 348/97 |
| 5,999,278 A | * | 12/1999 | Suzuki et al. | ............... 358/512 |

FOREIGN PATENT DOCUMENTS

JP          62-47278       2/1997

* cited by examiner

Primary Examiner—Tuan Ho
(74) Attorney, Agent, or Firm—Burns, Doane, Swecker & Mathis, LLP (57) ABSTRACT

A digital camera having an image reader which reads an optical image projected thereon and generates image signals by scanning the projected optical image, an optical unit which projects the optical image on the image reader at various ratios, and a controller which determines a range of the scanning operation performed by the image reader in accordance with the ratios employed by the optical unit.

30 Claims, 9 Drawing Sheets

Fig. 4A (TELEPHOTO CONDITION)

Fig. 4B (WIDE-ANGLE CONDITION)

Fig. 5A (TELEPHOTO CONDITION)

Fig. 5B (WIDE-ANGLE CONDITION)

Fig. 6A  EXPOSURE CONTROL PRIORITY MODE

Fig. 6B  BLUR PREVENTION PRIORITY MODE

Fig. 6C  NUMBER OF LINES PRIORITY MODE

DIGITAL CAMERA EMPLOYING A LINE SENSOR WITH ASPECT RATIO COMPENSATION MECHANISM

BACKGROUND OF THE INVENTION

1. Field of the Invention

The present invention pertains to a digital camera, and more particularly, to a digital camera that performs phototaking of a two dimensional image by means of a line sensor.

2. Description of the Related Art

A digital camera that performs photo-taking using a combination of a line sensor and a scanning mechanism, such as a mirror rotation mechanism, has been conventionally proposed (Japanese Laid-Open Patent Application No. 62-47278). This type of digital camera is called a line sensor camera. A line sensor camera has the advantage of being able to perform higher-resolution photo-taking than a digital camera that employs an area sensor. For example, phototaking of an entire A4-sized sheet of paper may be performed such that regular-sized characters on the page may be read.

By incorporating into the line sensor camera a zoom unit as a lens system to perform magnification, the amount of freedom in framing the photo may be increased, improving user convenience.

However, in a line sensor camera having a construction in which the optical axis of the lens system moves relative to the photo object in conjunction with secondary scanning, e.g., in a line sensor camera in which a mirror to perform secondary scanning is located on the front side of the lens system, when the lens system focal length changes during the zooming operation (that is, when the image magnification changes), a problem occurs that the aspect ratio of the object image (photo image) on the image pickup surface of the line sensor also changes.

SUMMARY OF THE INVENTION

In view of the situation described above, the object of the present invention is to provide an improved digital camera.

Another object of the present invention is to provide a line sensor camera in which the aspect ratio of the object image on the image pickup surface does not change when the image magnification changes.

These and other objects are achieved by providing a digital camera equipped with the following components:

an image reader which reads an optical image projected thereon and generates image signals by scanning the projected optical image;

an optical unit which projects the optical image on the image reader at various ratios; and a controller which determines a range of the scanning operation performed by the image reader in accordance with the ratios employed by the optical unit.

The photo-taking range in the direction of main scanning (i.e., the direction of alignment of the image pickup elements of the line sensor) depends on the focal length. On the other hand, the photo-taking range in the direction of secondary scanning depends on the angle of rotation of the scanning mechanism during photo-taking. Therefore, if the angle of rotation in the direction of secondary scanning used for photo-taking is increased or decreased in response to a change in the focal length (i.e., a change in the magnification), the aspect ratio of the object image on the image pickup surface may be made constant.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

This application is based on application No. 8-45128 filed in Japan, the content of which is incorporated hereinto by reference.

Figure 1:
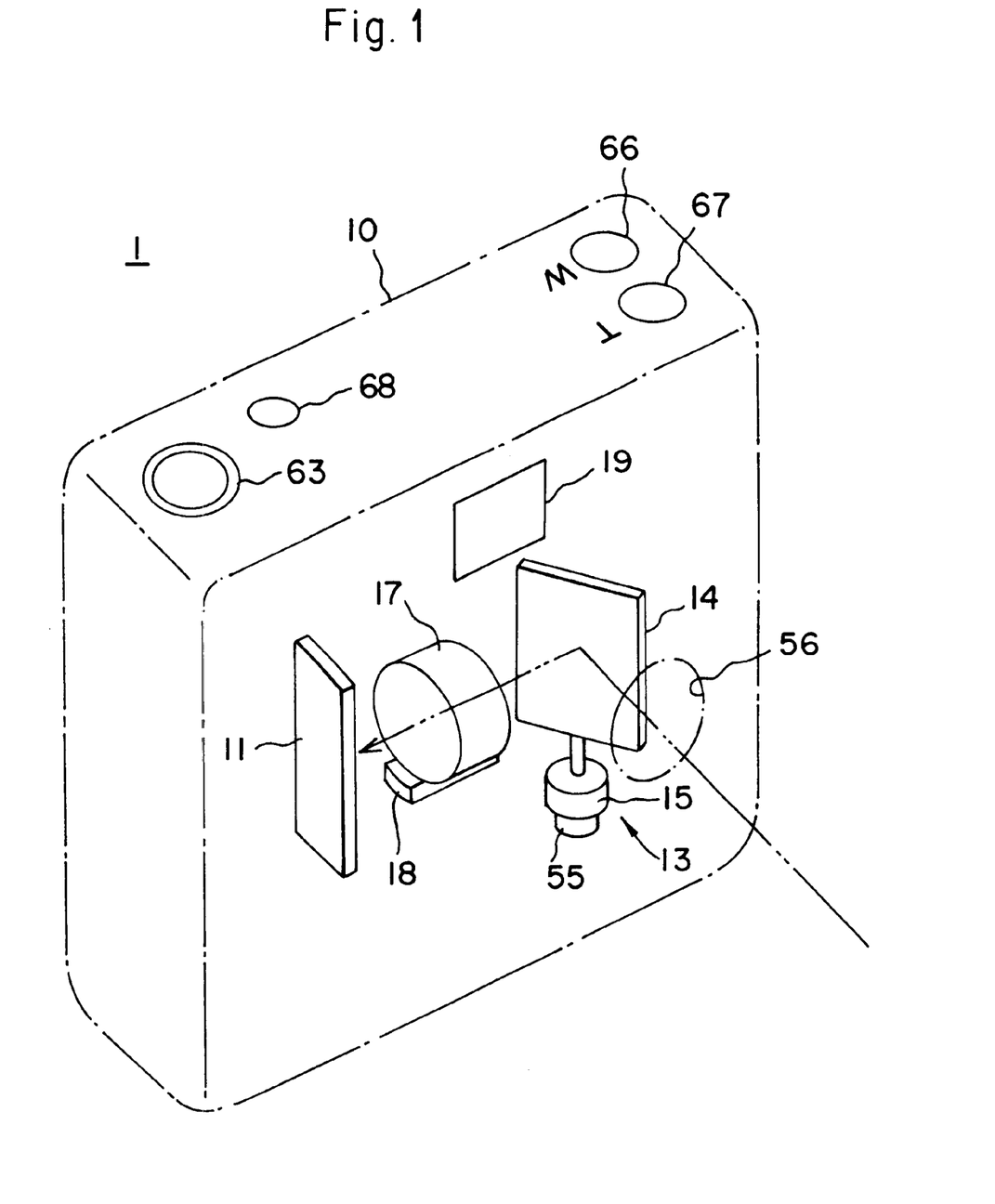
FIG. 1 is a perspective view showing a summary construction of a digital camera in which the line sensor of the present invention is employed.
Figure 2:
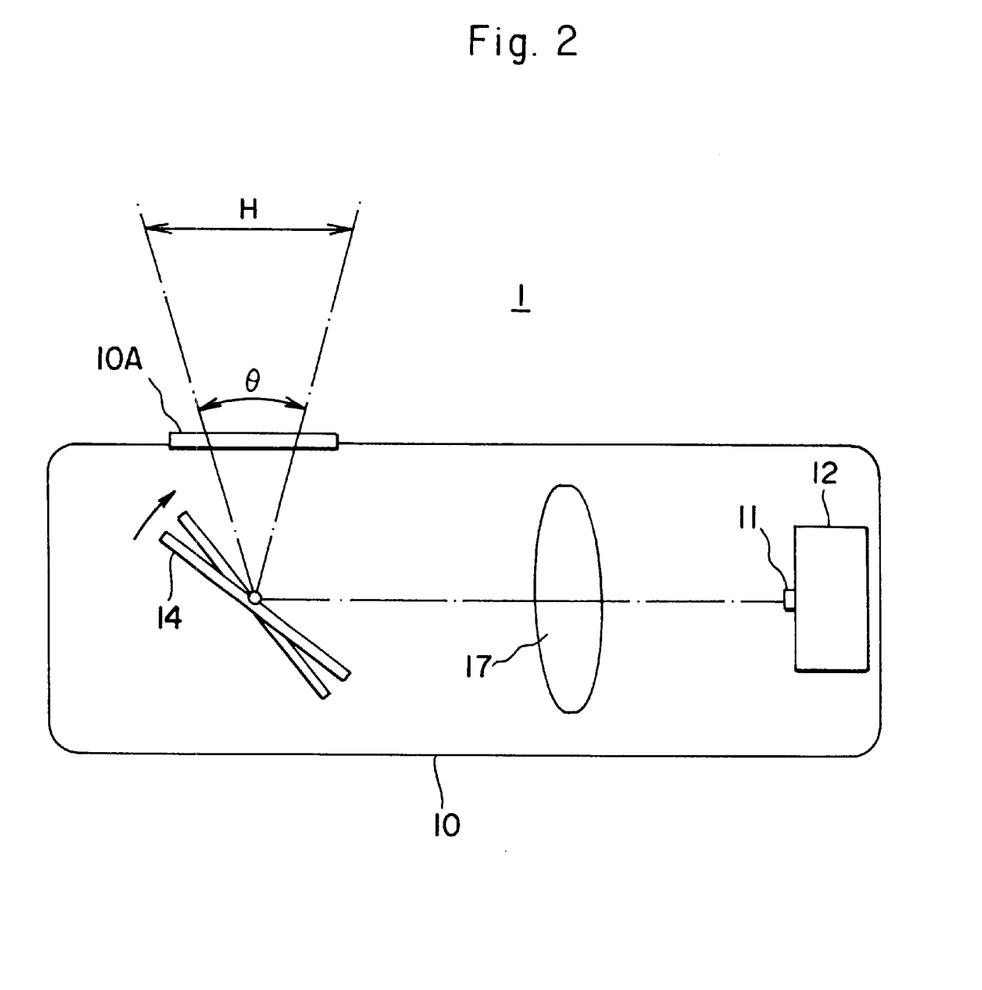
FIG. 2 is a drawing showing the construction of the scanning mechanism of the digital camera of FIG. 1.

FIG. 1 is a drawing showing the construction of a digital camera 1 employing the line sensor in which the present invention is applied, and FIG. 2 is a simplified drawing showing the elements of a scanning mechanism 13.

The camera 1 is a compact and lightweight line sensor camera. A window opening 56 which permits light from the photo object into the camera is located on the front surface of housing a protective glass 10A is embedded in the window opening 56. A mirror 14 which performs secondary scanning is located behind the window 56. Light from the photo object that is reflected off mirror 14 is projected onto a line sensor 11 by means of a projecting lens system 17. By having the mirror 14 located in front of (on the object side of) the projecting lens system 17 in this way, the thickness the housing 10 may be reduced.

The line sensor 11 is an image pickup device comprising multiple image pickup elements such as CCDs arranged in a line, and is fixed at a position at which the object image is formed. The image pickup elements of line sensor 11 are aligned in a vertical direction in the drawing. A different image pickup device (such as a MOS-type image pickup device) may be used for line sensor 11 instead of a CCD-based device.

The mirror 14 is attached to the rotation shaft of a scan motor 15. This rotation shaft is parallel to the direction of pixel alignment of line sensor 11 (the direction of main scanning). The photo object image moves on the light receiving surface of the line sensor 11 as the mirror 14 rotates. In other words, the photo object image is scanned over the line sensor 11 in a direction perpendicular to the direction of main scanning (i.e., the direction of secondary scanning). A rotation sensor which detects the angle and speed of rotation is attached to the scan motor 15. The line scanning mechanism 13 comprises the mirror 14, the scan motor 15 and the rotation sensor 55. As shown in FIG. 2, photo-taking range (angle of view) H in the direction of secondary scanning depends on the angle of rotation (amount of rotational movement) of mirror 14 during phototaking.

The projecting lens system 17 is an internal focusing zoom unit, and a portion of the incident light is used for autofocusing. An actuator 18 performs electric powered zooming is attached to the projecting lens system 17. The actuator 18 has a built-in encoder that indicates the position of the zoom lens. A finder 19 of camera 1 is an optical finder.

A release switch 63, a mode switch 68 and two zoom switches 66 and 67 are located on the top surface of the housing 10. Each time the user presses the mode switch 68, the photo-taking mode alternates in a repeating cycle. When the user presses the wide angle zoom switch 66, zooming in the wide-angle direction is carried out, and when the user presses the telephoto zoom switch 67, zooming in the telephoto direction is carried out. The mode switch 68 and the zoom switches 66 and 67 cannot be operated during photo-taking.

Figure 3:
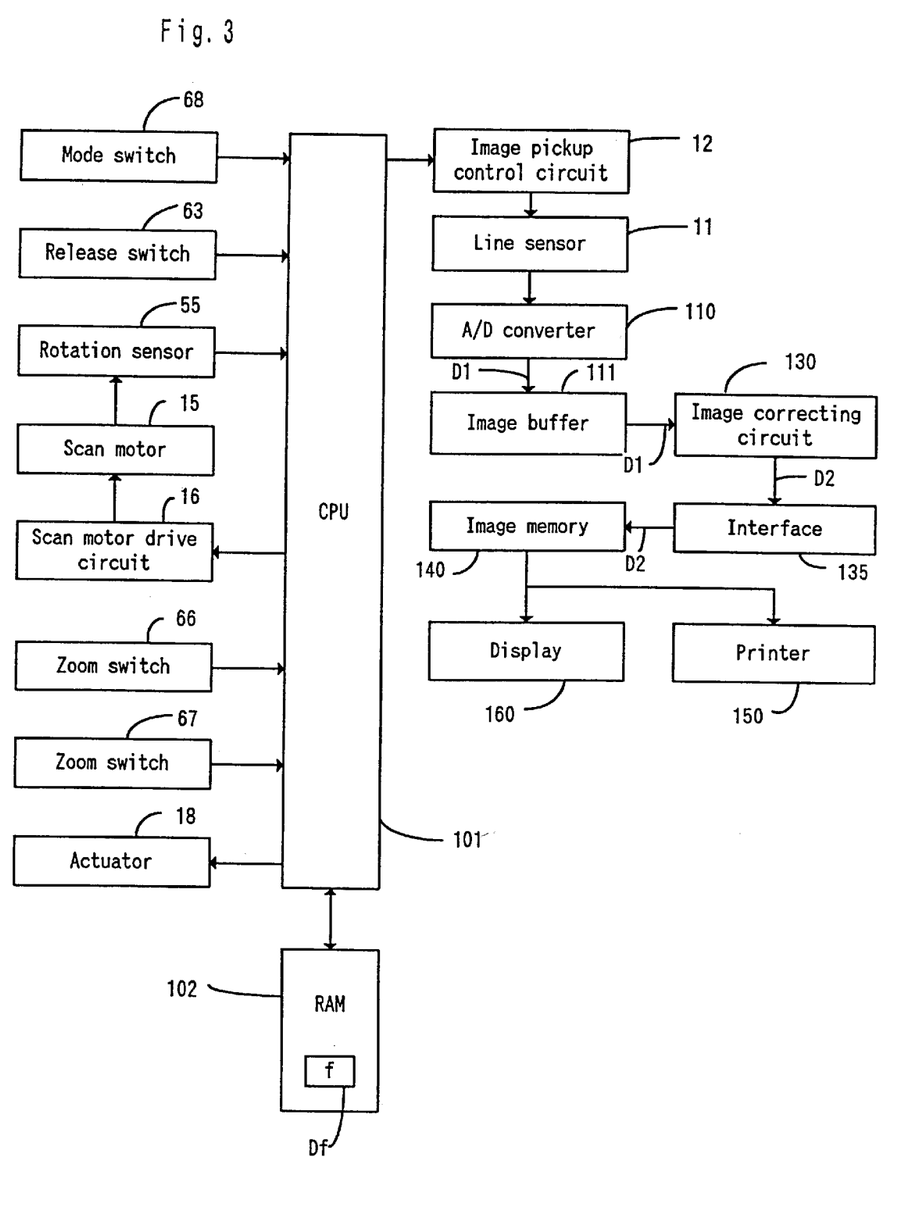
FIG. 3 is a block diagram of the control circuit of the digital camera.

FIG. 3 is a block diagram of the control circuit of the camera 1.

The construction of the control circuit centers around a microcomputer 101 (hereinafter CPU 101) that is responsible for overall control of the camera. Signals output from various switches described above and rotation sensor 55 are input to the CPU 101. The CPU 101 detects the angle and speed of rotation of scan motor 15 based on a signal output from rotation sensor 55 and sends an appropriate instruction to a scan motor drive circuit 16 such that the photo object image is scanned at a prescribed speed. In addition, the CPU 101 performs a routine to adjust photo-taking range H in the direction of secondary scanning in response to changes in the projection magnification in order to maintain the aspect ratio of the photo image at a constant level regardless of zooming. Specifically, it determines the angular position of the mirror 14 which is necessary to begin photo-taking, and then sets control parameters such as the scan time for one line (line cycle ΔT), rotation speed ω of the mirror 14 and number of the scanning lines N. A RAM 102 is a work area for the CPU 101 to execute programs, and is used as a temporary memory for focal length data Df that changes as a result of zooming.

An image pickup control circuit 12 begins control of the line sensor 11 in response to a START signal from the CPU 101, and outputs to the line sensor 11 a shift gate signal that regulates the time period of integration (charge accumulation) of the CCD. The line sensor 11 latches photoelectric conversion signals for each of the image pickup elements (pixels) in response to the shift gate signal, and outputs them to an A/D converter 110 in the order of pixel arrangement. This main scanning is repeated N times for each line cycle ΔT.

The A/D converter 110 converts the photoelectric conversion signals from the line sensor 11 into image pickup data D1 having a prescribed number of bits (for example, eight bits) per pixel in synchronization with the pixel clock. After image pickup data D1 is stored once in an image buffer 111 as actual photo object information recorded by the camera 1, it is transferred to an image correcting member 130. After subjecting image pickup data D1 to necessary processing such as image quality improvement, the image correcting circuit 130 outputs post-processing image data D2. The image data D2 output from the image correcting member 130 is then transferred to an image memory 140 via an interface 135, and then stored as image information for one frame. It is then sent out at an appropriate time from the image memory 140 to a printer 150 or a display 160 and used to perform either printing or display.

Figure 4A:
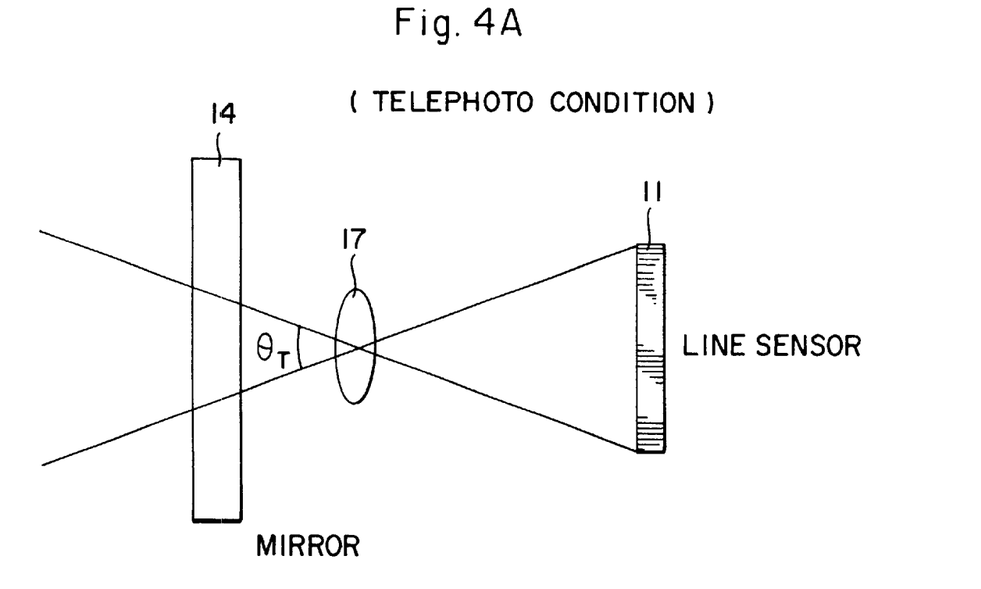
FIGS. 4A and 4B are drawings showing the angle of view of the digital camera in the direction of main scanning.
Figure 4B:
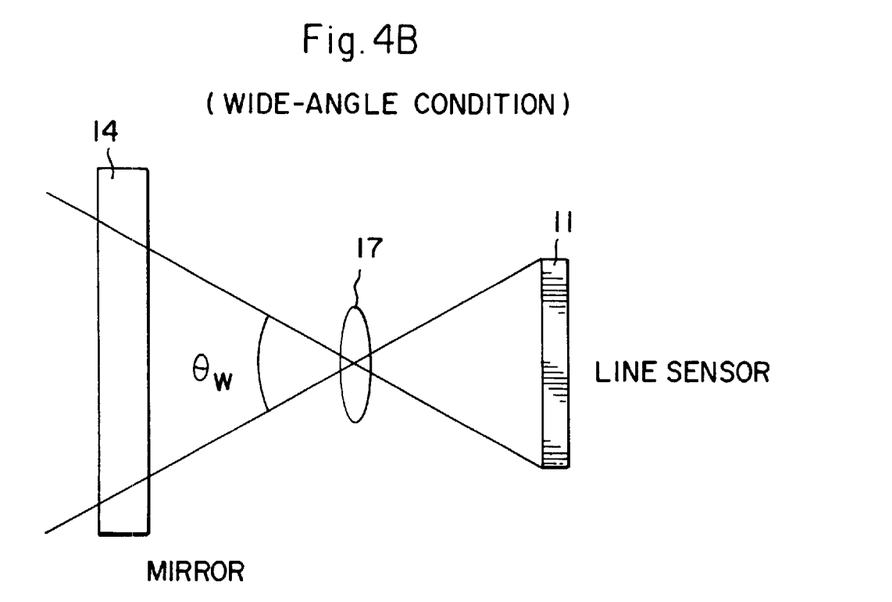

FIGS. 4A and 4B are drawings showing the angle of view in the direction of main scanning.

The photo-taking range in the direction of main scanning changes depending on the projection magnification (image magnification) after zooming. As shown in FIG. 4A, in the telephoto condition where the focal length of the projecting lens system 17 is increased by zooming, the angle of view $\Theta_T$ is small and the image magnification is large. Conversely, in the wide-angle condition in FIG. 4B, the angle of view $\Theta_W$ is large and the image magnification is small. The length of mirror 14 in the direction of main scanning is selected to be the length at which a sufficient amount of light from the photo object may be led to the line sensor 11 when the projecting lens system 17 is at the shortest focal length.

Figure 5A:
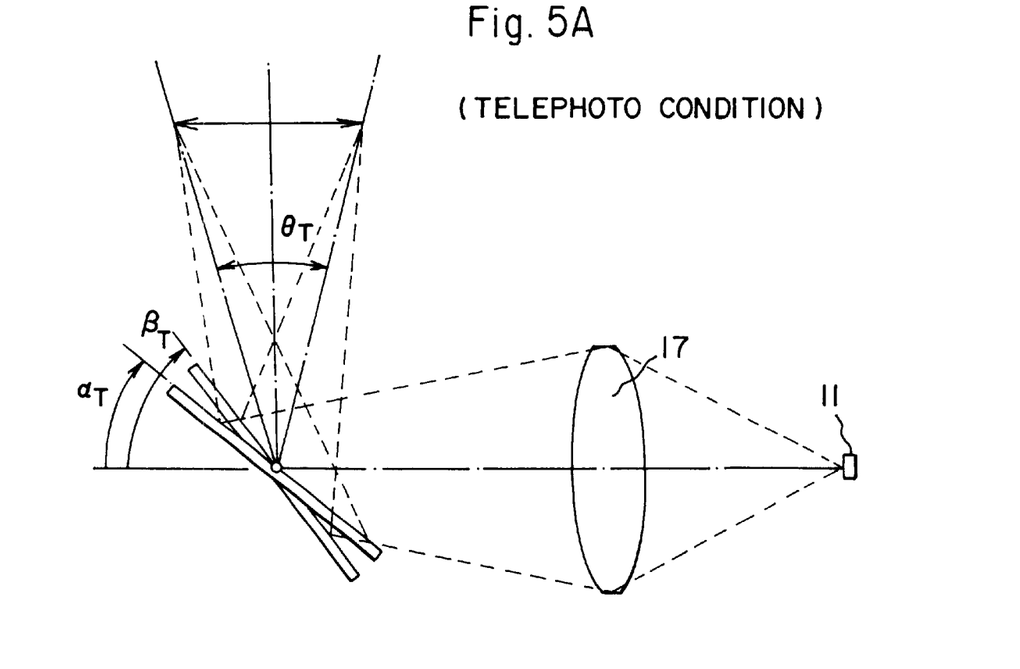
FIGS. 5A and 5B are drawings showing the photo-taking angle range of the digital camera in the direction of secondary scanning.
Figure 5B:
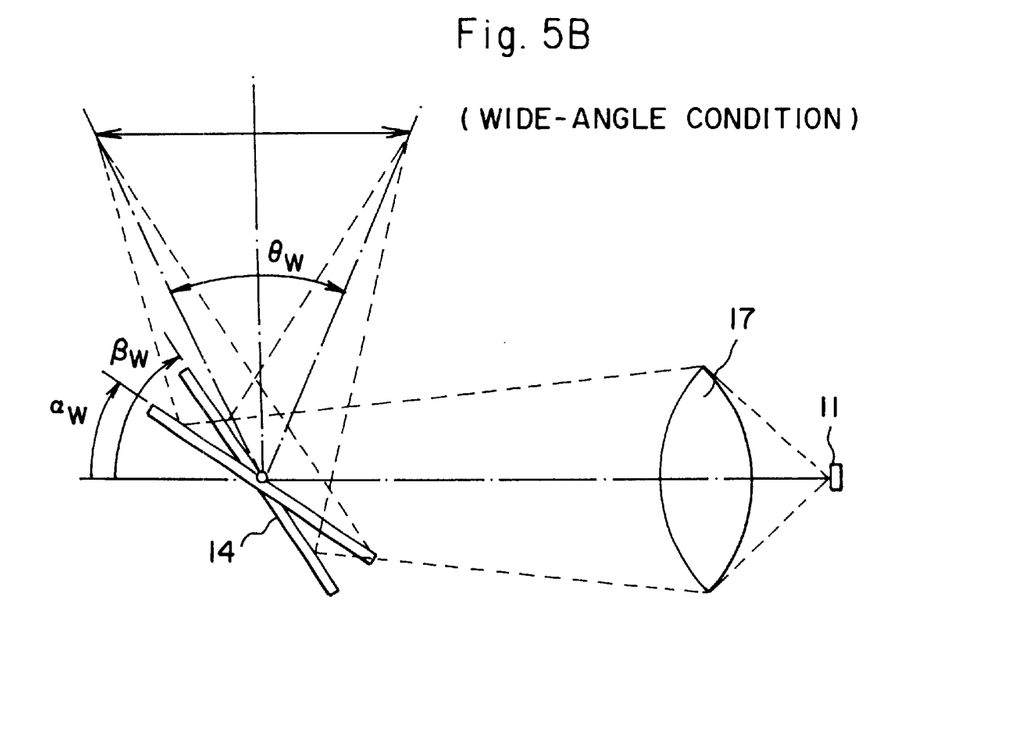

FIGS. 5A and 5B are drawings showing the photo-taking angle in the secondary scanning direction.

As is obvious from a comparison of FIGS. 5A and 5B, the scan angles $\Theta_T$ and $\Theta_W$, which are the angle of rotation of the optical axis during scanning for one frame, are changed depending on the degree of zooming. In other words, the scan angle $\Theta_W$ in the wide-angle condition is set to a larger value than the scan angle $\Theta_T$ in the telephoto condition.

In order to increase or decrease the scan angles $\Theta_T$ and $\Theta_W$ without changing the direction of the central axis of the angle that defines the photo-taking range, the timing of the beginning and ending of scanning should be adjusted appropriately. As shown in FIG. 5A, in the telephoto condition, photo-taking is begun when the rotational position of the mirror 14 reaches the position at which the amount of displacement from the reference position is an angle (photo-taking commencement angle) $\alpha_T$, and photo-taking is completed when the rotational position of the mirror 14 reaches the position at which the amount of displacement from the reference position is an angle (photo-taking completion angle) $\beta_T$. As shown in FIG. 5B, in the wide-angle condition, photo-taking is begun when the rotational position of mirror 14 reaches the position at which the amount of displacement from the reference position is an angle $\alpha_W$, which is smaller than angle $\alpha_T$, and photo-taking is completed when the rotational position of the mirror 14 reaches the position at which the amount of displacement from the reference position is an angle $\beta_W$, which is larger than the angle $\beta_T$. Angles $\alpha_T$, $\alpha_W$, $\beta_T$ and $\beta_W$ have the following interrelationships:

$$\alpha_W < \alpha_T < \beta_T < \beta_W.$$

As described above, in order to increase or decrease angle $\Theta_T$ or angle $\Theta_W$, at least one of the three control parameters (line cycle ΔT, rotation speed ω, number of lines N) must be changed.

Camera 1 has three photo-taking modes that are defined by different setting possibilities for the three control parameters, as shown in the table below.

| Photo-taking mode | ΔT | ω | N |
|---|---|---|---|
| ① Exposure control priority mode | Variable | Fixed | Fixed |
| ② Blur prevention priority mode | Fixed | Variable | Fixed |
| ③ Number of lines priority mode | Fixed | Fixed | Variable |

Figure 6A:
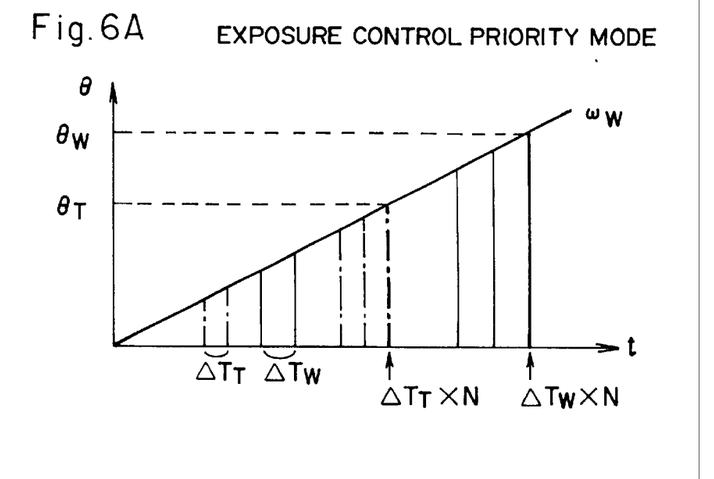
FIGS. 6A, 6B and 6C are graphs to explain the operations of three photo-taking modes.
Figure 6B:
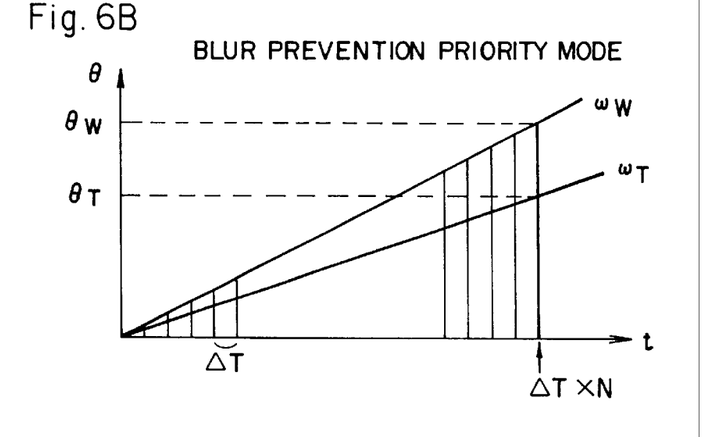
Figure 6C:
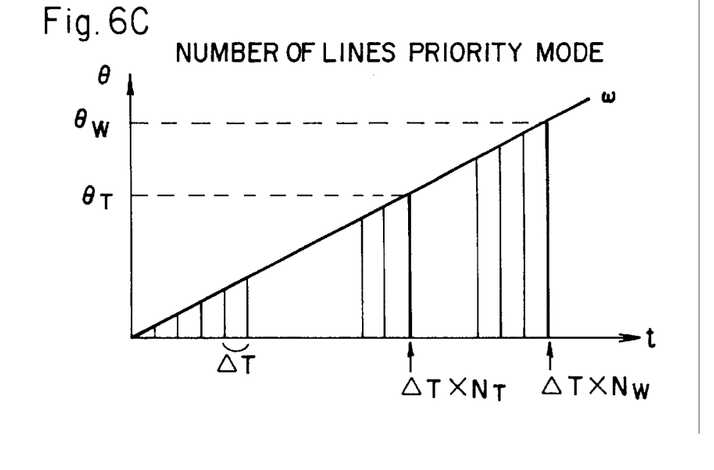

FIGS. 6A, 6B and 6C are graphs to explain the operations of the three photo-taking modes. The horizontal axis represents period of time t required for photo-taking, while the vertical axis represents the scan angle Θ.

Here, variations in the values of the parameters are explained using the hypothetical case of zooming from the telephoto condition to the wide-angle condition, i.e., of increasing the value of scan angle Θ, for the sake of convenience. The subscript character 'T' following each parameter indicates the telephoto condition, while the subscript character 'W' following each parameter indicates the wide-angle condition.

Where exposure control for line sensor 11 is concerned, it is preferable for line cycle ΔT to be long rather than short. This permits the charge accumulation time set for the CCD to be sufficiently long, allowing insufficient exposure to be avoided.

As shown in FIG. 6A, in exposure control priority mode, when the scan angle is increased from $\Theta_T$ to $\Theta_W (\Theta_T<\Theta_W)$, the line cycle is increased from $\Delta T_T$ to $\Delta T_W (\Delta T_T<\Delta T_W)$. Rotation speed ω and number of lines N are fixed. Therefore, the exposure time for one frame (i.e., the scan time for number of lines N) is longer in the wide-angle condition than in the telephoto condition.

When the exposure period is longer, the probability of blurring of the photo image due to camera shake during photo-taking increases. As shown in FIG. 6B, in blur prevention priority mode, when scan angle Θ is increased, rotation speed ω is increased from $\omega_T$ to $\omega_W (\omega_T<\omega_W)$ without changing line cycle ΔT. Consequently, the exposure time for one frame becomes fixed regardless of zooming, and the probability that blurring will occur does not increase.

As shown in FIG. 6C, in number of lines priority mode, when scan angle Θ is increased, number of lines N is increased from $N_T$ to $N_W (N_T<N_W)$. Consequently, the resolution in the direction of secondary scanning becomes fixed regardless of zooming. Because line cycle ΔT and rotation speed ω are fixed, the exposure time in the wide-angle condition ($=\Delta T \times N_W$) is longer than the exposure time in the telephoto condition ($=\Delta T \times N_T$).

Figure 7:
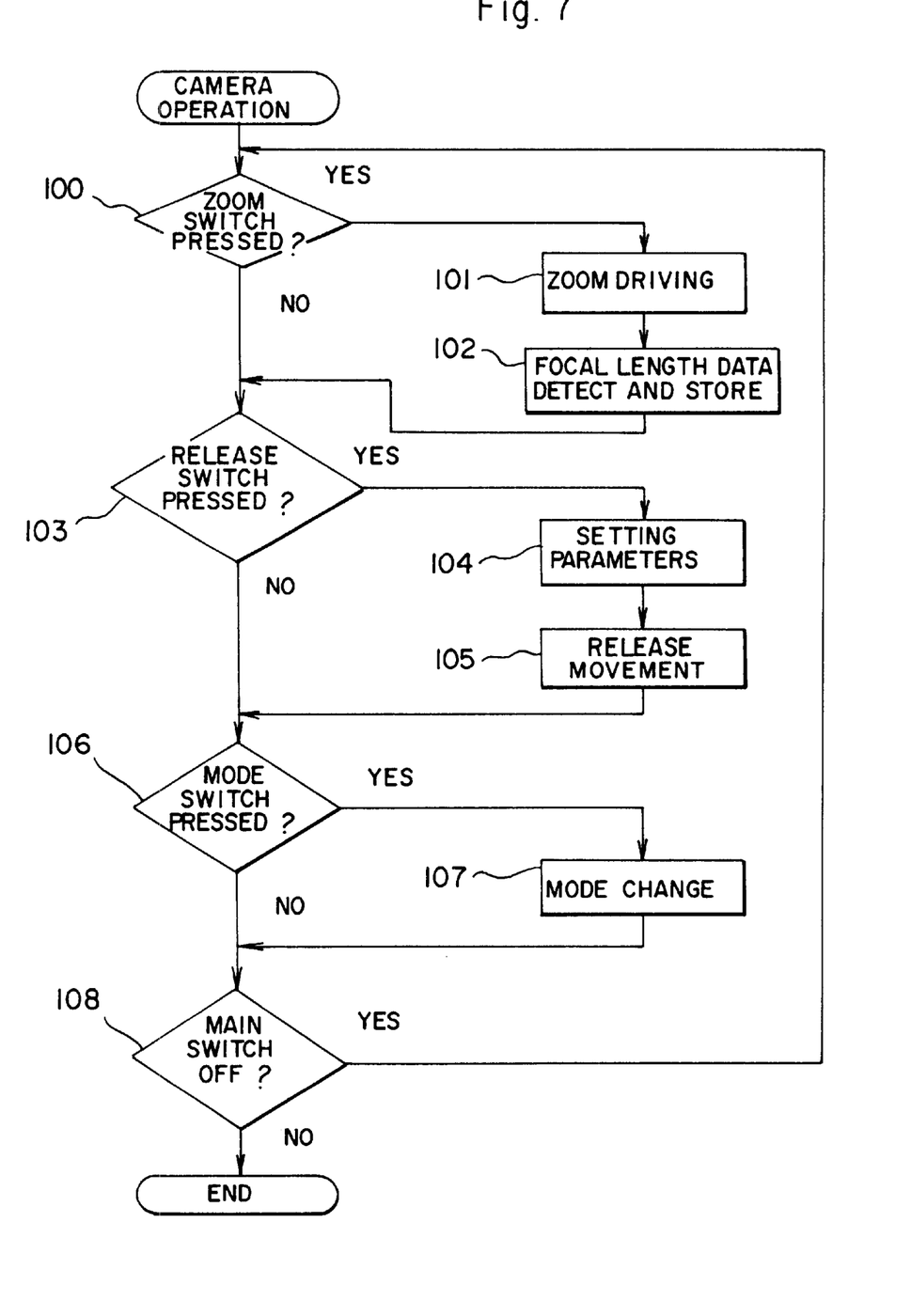
FIG. 7 is a flow chart showing the control sequence of the digital camera.

FIG. 7 is a flow chart showing the control sequence for the operation of the camera performed by CPU 101.

When a battery is housed in the camera, the control power supply is activated and the main switch is ON, the CPU 101 performs processing in response to the operation of switches. When the zoom switches 66 and 67 are pressed (#100), drive control of the actuator 18 is performed (#101), and focal length data Df corresponding to the most recent position of the movable part of the projecting lens system 17 is stored in memory (#102).

When the release switch 63 is pressed (#103), a release operation is performed in which parameters α, β, ΔT, ω and N are set based on focal length data Df residing in RAM 102 (#104), and the photo object image is then converted into image data D2 and is stored in image memory 140 (#105).

When mode switch 68 is pressed (#106), the photo-taking mode alternates in a repeating cycle as described above (#107). Until the main switch is turned OFF, the existence of any change in the status of each switch is monitored (#108, #100).

Figure 8:
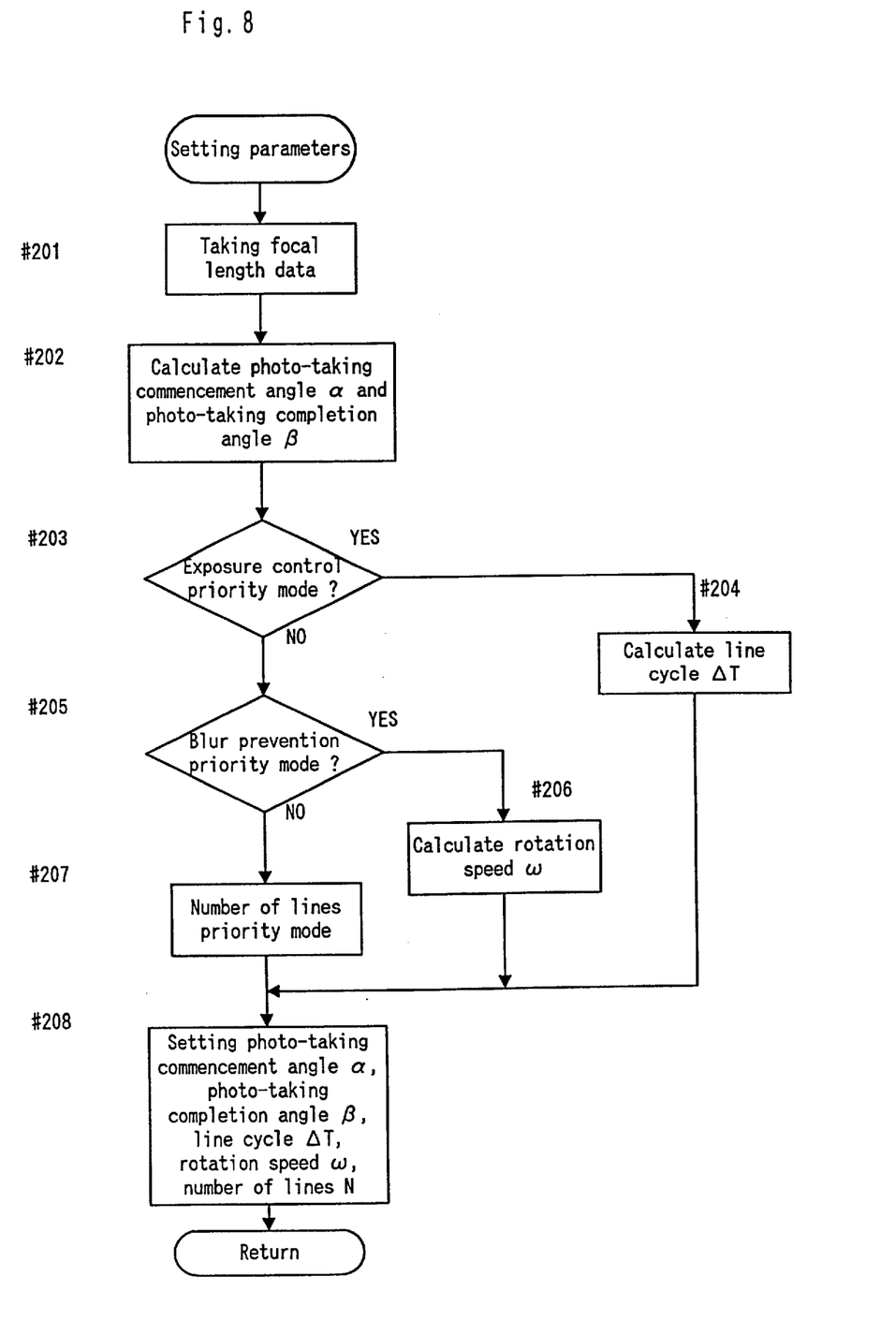
FIG. 8 is a flow chart showing the specific sequence of the parameter setting subroutine of FIG. 7.

FIG. 8 is a flow chart showing the specific sequence of the parameter setting subroutine of step #104 in FIG. 7.

First, as a process to increase or decrease scan angle Θ during photo-taking in response to the focal length (image magnification) so as to keep the aspect ratio of the photo image constant, focal length data Df is taken in and photo-taking commencement angle α and photo-taking completion angle β are calculated (#201, #202).

Parameter values appropriate to focal length data Df are then calculated in accordance with the photo-taking mode (#203–#207). The parameter values for the release operation for the current exposure are set and the subroutine returns to the main routine (#208). The parameter values appropriate to focal length data Df may be stored beforehand in a ROM, etc., and said values may then be read out in steps #203 through #207.

Figure 9:
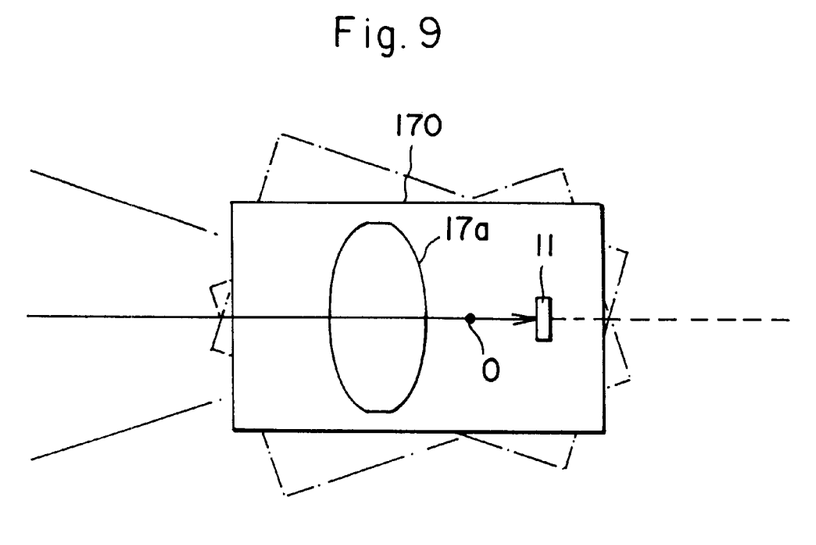
FIG. 9 is a drawing showing another example of the scanning mechanism.

While the embodiment described above performs line scanning by the rotating mirror 14, the present invention may also be applied in a line sensor camera having a construction in which the optical axis moves relative to the photo object during secondary scanning, e.g., a construction in which image pickup unit 170 comprising a lens system 17a and the line sensor 11 integrated as a single unit is rotated within a prescribed angular range, as shown in FIG. 9. In the example shown in FIG. 9, the center of rotation is located between the lens system 17a and the line sensor 11, but the position of the center of rotation may be in front of the lens system 17a or behind the line sensor 11.

By shifting photo-taking commencement angle α and photo-taking completion angle β to photo-taking commencement angle α' and photo taking completion angle β', respectively, when performing photo-taking using a prescribed scan angle $\Theta(\Theta=\beta-\alpha=\beta'-\alpha')$, the same effect as panning may be attained while the aspect ratio of the photo image is maintained at a constant level. By increasing scan angle Θ in the telephoto condition in the same manner as in the wide-angle condition, the aspect ratio of the photo-taking frame may be changed while the aspect ratio of the photo image is maintained at a constant level, realizing a horizontally wide (panorama) photo. In addition, while the embodiments described above involved configurations using the zoom units (lens systems) 17 and 17a, the present invention may also be applied in a configuration in which the focal length is changed by changing the photo-taking lens.

In addition, while the embodiments described above involved configurations rotating the mirror for a predetermined angle to take an image, the present invention may also be applied in a configuration in which the image data is extracted by changing a range of sampling image data generated from a line sensor.

Moreover, the present invention may also be applied in an image reading scanner which moves relative to a sensor with respect to an original object.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital camera comprising:
    an image reader which reads an optical image projected thereon and generates image signals by scanning the projected optical image;
    an optical unit which projects the optical image on said image reader at various magnification ratios; and
    a controller which determines a range of the scanning operation performed by said image reader and at least one of scanning parameters of a scanning speed, a time period required for the scanning, and a number of scanning lines in accordance with the various magnifications ratios employed by said optical unit to maintain an aspect ratio on the image reader at a constant level.

2. A digital camera as claimed in claim 1, wherein said controller determines the range by controlling a start timing of image reading operation performed by said image reader.

3. A digital camera as claimed in claim 2, wherein said image reader includes a scanning mirror which rotates within a predetermined range for scanning the projected optical image, and said controller controls the start timing of image reading operation by varying a rotational angular position at which said scanning mirror is located when the image reading operation starts.

4. A digital camera as claimed in claim 1, wherein said optical unit having a zooming mechanism for varying ratios of image projection.

5. A digital camera as claimed in claim 1, wherein the image reader includes a scanning mirror which rotates for scanning the projected optical image, and the controller determines the range by determining a commencement angle commencing the image reading thereat and a completion angle completing the image reading thereat of the mirror.

6. A digital camera as claimed in claim 1, wherein the image reader includes a scanning mirror which rotates for scanning the projected optical image, and the controller determines a start timing of the rotation at which the image reader starts the image reading operation and a finish timing of the rotation at which the image reader finishes the image reading operation.

7. A digital camera as claimed in claim 1, further comprising a mode setter for selectively setting modes of an exposure control priority mode, blur prevention priority mode, and number of lines priority mode.

8. A digital camera as claimed in claim 7, wherein when the exposure control priority mode is set at the mode setter, the setting section sets a time period as the parameter.

9. A digital camera as claimed in claim 7, wherein when the blur prevention priority mode is set at the mode setter, the setting section sets a scanning speed as the parameter.

10. A digital camera as claimed in claim 7, wherein when the number of lines priority mode is set at the mode setter, the setting section sets a number of lines as the parameter.

11. A digital camera comprising:
    an image reader which reads an optical image projected thereon and generates image signals by scanning the projected optical image;
    an optical unit which projects the optical image on said image reader at various magnification ratios; and
    a controller which determines a range of the scanning operation performed by said image reader in accordance with the various magnifications ratios employed by said optical unit,
    wherein said controller determines the range by controlling a scanning speed of image reading operation performed by said image reader.

12. A digital camera as claimed in claim 11, wherein said image reader includes a scanning mirror which rotates for scanning the projected optical image, and said controller controls the scanning speed by varying a rotational speed of the scanning mirror.

13. A digital camera comprising:
    an image reader which reads an optical image projected thereon and generates image signals by scanning the projected optical image;
    an optical unit which projects the optical image on said image reader at various magnification ratios; and
    a controller which determines a range of the scanning operation performed by said image reader in accordance with the various magnifications ratios employed by said optical unit,
    wherein said controller determines the range by controlling a time period required for scanning one scanning line by said image reader.

14. A digital camera comprising:
    an image reader which reads an optical image projected thereon and generates image signals by scanning the projected optical image;
    an optical unit which projects the optical image on said image reader at various magnification ratios; and
    a controller which determines a range of the scanning operation performed by said image reader in accordance with the various magnifications ratios employed by said optical unit,
    wherein said controller determines the range by varying a number of scanning lines of said image reader.

15. An image reading device comprising:
    an image reader which reads optical image projected thereon and generates image signals by scanning the projected optical image;
    an optical unit which projects the optical image on said image reader at various magnification ratios; and
    a controller which determines a range of the scanning operation performed by said image reader in accordance with the various magnification ratios employed by said optical unit to maintain an aspect ratio on the image reader at a constant level, wherein said controller determines the range by controlling a start timing of image reading operation performed by said image reader.

16. An image reading device as claimed in claim 15, wherein said image reader includes a scanning mirror which rotates within a predetermined range for scanning the projected optical image, and said controller controls the start timing of image reading operation by varying a rotational angular position at which said scanning mirror is located when the image reading operation starts.

17. An image reading device claimed in claim 15, wherein said optical unit having a zooming mechanism for varying ratios of image projection.

18. An image reading device comprising:
    an image reader which reads optical image projected thereon and generates image signals by scanning the projected optical image;
    an optical unit which projects the optical image on said image reader at various magnification ratios; and
    a controller which determines a range of the scanning operation performed by said image reader in accordance with the various magnification ratios employed by said optical unit,
    wherein said controller determines the range by controlling a scanning speed of image reading operation performed by said image reader.

19. An image reading device as claimed in claim 18, wherein said image reader includes a scanning mirror which rotates for scanning the projected optical image, and said controller controls the scanning speed by varying a rotational speed of the scanning mirror.

20. An image reading device comprising:
   an image reader which reads optical image projected thereon and generates image signals by scanning the projected optical image;
   an optical unit which projects the optical image on said image reader at various magnification ratios; and
   a controller which determines a range of the scanning operation performed by said image reader in accordance with the various magnification ratios employed by said optical unit,
   wherein said controller determines the range by controlling a time period required for scanning one scanning line by said image reader.

21. An image reading device comprising:
   an image reader which reads optical image projected thereon and generates image signals by scanning the projected optical image;
   an optical unit which projects the optical image on said image reader at various magnification ratios; and
   a controller which determines a range of the scanning operation performed by said image reader in accordance with the various magnification ratios employed by said optical unit,
   wherein said controller determines the range by varying a number of scanning lines of said image reader.

22. An image reading device comprising:
   an image reader which reads optical image projected thereon and generates image signals by scanning the projected optical image;
   an optical unit which projects the optical image on said image reader at various magnification ratios; and
   a controller which determines a range of the scanning operation performed by said image reader in accordance with the various magnification ratios employed by said optical unit,
   wherein said optical unit having a projection lens which projects the optical image on the said image reader, said projection lens being exchangeable for other projection lens having a different projection ratio.

23. An image reading device comprising:
   an image reader which reads an optical image projected thereon and generates image signals by scanning the projected optical image;
   an optical unit which projected the optical image on said image reader at various magnification ratios; and
   a controller which determines a range of the scanning operation performed by said image reader and at least one of scanning parameters of a scanning speed, a time period required for the scanning, and a number of scanning lines in accordance with the various magnification ratios employed by said optical unit,
   wherein said controller determines the range by controlling a scanning speed of image reading operation performed by said image reader.

24. A digital camera as claimed in claim 23, wherein the image reader includes a scanning mirror which rotates for scanning the projected optical image, and the controller determines the range by determining a commencement angle commencing the image reading thereat and a completion angle completing the image reading thereat of the mirror.

25. A digital camera as claimed in claim 23, wherein the image reader includes a scanning mirror which rotates for scanning the projected optical image, and the controller determines a start timing of the rotation at which the image reader starts the image reading operation and a finish timing of the rotation at which the image reader finishes the image reading operation.

26. A digital camera as claimed in claim 23, further comprising a mode setter for selectively setting modes of an exposure control priority mode, blur prevention priority mode, and number of lines priority mode.

27. A digital camera as claimed in claim 26, wherein when the exposure control priority mode is set at the mode setter, the setting section sets a time period as the parameter.

28. A digital camera as claimed in claim 26, wherein when the blur prevention priority mode is set at the mode setter, the setting section sets a scanning speed as the parameter.

29. A digital camera as claimed in claim 26, wherein when the number of lines priority mode is set at the mode setter, the setting section sets a number of lines as the parameter.

30. A digital camera comprising:
   an image reader which reads an optical image projected thereon and generates image signals by scanning the projected optical image;
   an optical unit which projects the optical image on said image reader at various magnification ratios; and
   a controller which determines a range of the scanning operation performed by said image reader in accordance with the various magnifications ratios employed by said optical unit to maintain an aspect ratio on the image reader at a constant level,
   wherein said controller determines the range by controlling a start timing of image reading operation performed by said image reader.

* * * * *